United States Patent
Inakagata

(10) Patent No.: US 9,236,790 B2
(45) Date of Patent: Jan. 12, 2016

(54) POWER DISTRIBUTION DEVICE AND POWER DISTRIBUTION SYSTEM USING SAME

(75) Inventor: Satoru Inakagata, Nara (JP)

(73) Assignee: Panasonic Corporation, Osaka (JP)

( * ) Notice: Subject to any disclaimer, the term of this patent is extended or adjusted under 35 U.S.C. 154(b) by 811 days.

(21) Appl. No.: 13/499,759

(22) PCT Filed: Sep. 30, 2010

(86) PCT No.: PCT/IB2010/002474
§ 371 (c)(1),
(2), (4) Date: Apr. 2, 2012

(87) PCT Pub. No.: WO2011/039616
PCT Pub. Date: Apr. 7, 2011

(65) Prior Publication Data
US 2012/0205985 A1 Aug. 16, 2012

(30) Foreign Application Priority Data

Oct. 2, 2009 (JP) ................................. 2009-230559
Nov. 6, 2009 (JP) ................................. 2009-255359

(51) Int. Cl.
*H02M 1/10* (2006.01)
*H02J 1/00* (2006.01)
(52) U.S. Cl.
CPC .............. *H02M 1/10* (2013.01); *Y10T 307/707* (2015.04)
(58) Field of Classification Search
USPC .......................................... 307/82, 11, 66, 80
See application file for complete search history.

(56) References Cited

U.S. PATENT DOCUMENTS

| | | | |
|---|---|---|---|
| 3,407,264 A * | 10/1968 | Cull ........................... | 174/138 F |
| 5,132,543 A * | 7/1992 | Valentine et al. ............. | 250/388 |
| 5,475,295 A * | 12/1995 | Hong ....................... | 340/636.15 |
| 5,784,626 A * | 7/1998 | Odaohara ..................... | 713/300 |
| 5,940,272 A | 8/1999 | Emori et al. | |
| 7,880,334 B2 * | 2/2011 | Evans et al. ..................... | 307/66 |
| 8,288,891 B2 * | 10/2012 | Ballantine et al. ............. | 307/65 |
| 8,482,155 B2 * | 7/2013 | Choi et al. ........................ | 307/71 |
| 8,810,066 B2 * | 8/2014 | Moon ............................. | 307/65 |
| 2002/0031000 A1 * | 3/2002 | Sakai et al. ..................... | 363/65 |
| 2002/0064010 A1 * | 5/2002 | Nelson et al. ................... | 361/64 |
| 2006/0087800 A1 * | 4/2006 | Savage .......................... | 361/601 |
| 2006/0092588 A1 * | 5/2006 | Realmuto et al. ............... | 361/62 |

(Continued)

FOREIGN PATENT DOCUMENTS

CN 101436778 A 5/2009
JP 6044438 3/1985
(Continued)

OTHER PUBLICATIONS

International Search Report from PCT/IB2010/002474.
(Continued)

*Primary Examiner* — Jared Fureman
*Assistant Examiner* — Emmanuel R Dominique
(74) *Attorney, Agent, or Firm* — Bacon & Thomas, PLLC

(57) ABSTRACT

A power distribution device includes a direct current power source DC/DC converter connected to a direct current power source, and an AC/DC converter connected to an alternating current power source. The direct current power source DC/DC converter and the AC/DC converter are accommodated in a single container from which a DC load supply line is led out.

4 Claims, 11 Drawing Sheets

(56) References Cited

U.S. PATENT DOCUMENTS

| | | | | |
|---|---|---|---|---|
| 2006/0149396 A1* | 7/2006 | Templeton | ................... | 700/22 |
| 2007/0044837 A1* | 3/2007 | Simburger et al. | ........... | 136/292 |
| 2008/0067869 A1* | 3/2008 | Evans et al. | ................... | 307/11 |
| 2008/0246449 A1* | 10/2008 | Yokozawa | ................... | 323/234 |
| 2009/0179499 A1* | 7/2009 | Realmuto et al. | ............... | 307/80 |
| 2011/0010476 A1* | 1/2011 | Kreider et al. | ............... | 710/106 |
| 2011/0187197 A1* | 8/2011 | Moth | ........................... | 307/66 |
| 2012/0255592 A1* | 10/2012 | Chang et al. | ................... | 136/244 |

FOREIGN PATENT DOCUMENTS

| | | |
|---|---|---|
| JP | 322831 | 1/1991 |
| JP | 5304712 | 11/1993 |
| JP | 815344 | 6/1996 |
| JP | 3031963 | 9/1996 |
| JP | 1169659 | 3/1999 |
| JP | 200251483 | 2/2002 |
| JP | 2002199515 | 7/2002 |
| JP | 2003284245 | 10/2003 |
| JP | 2004282802 | 10/2004 |
| JP | 2005312140 | 11/2005 |
| JP | 2008253119 | 10/2008 |
| JP | 2009153301 | 7/2009 |
| JP | 2009159690 | 7/2009 |

OTHER PUBLICATIONS

Japanese Office Action dated Jun. 25, 2013 and English summary thereof.

Chinese Office Action issued on Aug. 29, 2014 in a corresponding Chinese application No. 201080054546.5 and the English Search Report thereof.

* cited by examiner

POWER DISTRIBUTION DEVICE AND POWER DISTRIBUTION SYSTEM USING SAME

FIELD OF THE INVENTION

The present invention relates to a power distribution device and a power distribution system using the same and, more particularly, to a power distribution device and a power distribution system that have the function of distributing a DC power supplied from a DC power source to loads.

BACKGROUND OF THE INVENTION

Conventionally, a power distribution system for distributing an AC power and a DC power in a building such as a house, a store or an office building, is disclosed in, e.g., Patent Document 1. The power distribution system is a grid-connected system that includes a DC power generation equipment such as a solar photovoltaic power generation apparatus, as a private power station, installed in a building. The power distribution system converts a DC power outputted from the DC power generation equipment into an AC power, and performs a grid connection of the AC power converted from the DC power of the DC power generation equipment and a commercial power source (an AC power system) supplied from an electric power company.

Such a grid-connected system employs a configuration where a DC power generated by the DC power generation equipment is converted into an AC power by a power converter (a power conditioner) and is cooperated with the commercial power source serving as an AC power source. Further, the grid-connected system enables a surplus power to reversely flow into the commercial power source (so-called electric power selling) when a power supplied from the DC power generation equipment exceeds the power consumed by loads within a building.

Furthermore, as a power distribution system for supplying a DC power to a DC load device, there is proposed a power supply system in, e.g., Patent Document 2. In the power supply system, a DC power supply unit communicates with a terminal device of the DC load device and a power-feeding control unit compares power reception information notified by the terminal device with operational power information stored in an operation information memory, and controls an output voltage to supply the DC load device with a proper voltage and current.

In such power distribution system for distributing the DC power, multiple power sources including a DC power generation equipment such as a solar photovoltaic power generation apparatus or a fuel cell, a battery, a commercial power source and the like, may be used. Therefore, it is necessary to provide a power distribution system suitable to these multiple power sources. In this case, typically, an output converter such as a DC/DC converter or an AC/DC converter is provided for each of the power sources, and outputs a DC power with a specific voltage level.

As described above, if there are used multiple power sources, the output converter such as a DC/DC converter or an AC/DC converter is required in order to distribute a power from the power sources. Thus, it is necessary to simplify and make safe the management of the plurality of power sources, such as installation and maintenance. In particular, since a plurality of heat-generating output converters is provided on a distribution board, a problem of heat dissipation property arises in a DC distribution board, unlike an AC distribution board.

Recently, there are provided an AC input terminal from an AC power source, a DC input terminal from a DC power source such as solar cells, and a DC output terminal connected to DC device all together in the distribution board. An erroneous connection between the terminals may lead to damage of devices and a serious accident, and cause danger.

Furthermore, a power distribution system disclosed in Patent Document 3 adopts a configuration for controlling the output of a secondary battery or solar cells so that a power converter or AC/DC converter can be operated at maximum conversion efficiency. Besides, in the power distribution system of Patent Document 3, multiple AC/DC converters are used depending on an amount of a power supplied to a load.

In the power distribution system of Patent Document 3, however, if the amount of the power supplied to the load varies due to, e.g., an increase of a load or a replacement of a load, the existing power converter cannot supply enough power to the load. Further, in a power distribution system having a specification where a power conversion efficiency increases with an increase in the amount of the power supplied to a load, a power conversion efficiency may lower due to a significant change in the amount of the power supplied to the load.

Such problem can be solved by changing the specification of the power distribution system in accordance with the load. In this case, the entire power distribution system has to be replaced. As a result, the existing power distribution system needs to be discarded, thereby causing an increase in cost.

RELATED ART DOCUMENTS

[Patent Document 1] Japanese Patent Application Publication No. 2003-284245
[Patent Document 2] Japanese Patent Application Publication No. 2009-159690
[Patent Document 3] Japanese Patent Application Publication No. 2009-153301

SUMMARY OF THE INVENTION

In view of the above, the present invention provides a power distribution device and a power distribution system for DC power that are easy to install and maintain. Further, the present invention provides a power distribution device that has excellent heat dissipation properties and rises less in temperature. Furthermore, the present invention provides a safe power distribution device capable of preventing an error connection.

Additionally, the present invention provides a power distribution device capable of easily changing a specification of a power distribution system.

In accordance with a first aspect of the present invention, there is provided a power distribution device, including: a DC power source DC/DC converter connected to a DC power source; an AC/DC converter connected to an AC power source; and a DC load line connected to a DC load, wherein the DC/DC converter and the AC/DC converter are accommodated in a single container, and the DC load line is drawn from the container.

Further, the power distribution device includes: a battery; a battery DC/DC converter connected to the battery; and a protection circuit connected to at least one of the DC power source DC/DC converter, the battery DC/DC converter, and the AC/DC converter.

With this configuration, handling is easy because elements necessary to supply power from the DC power source is formed into a single unit and accommodated in the container.

Handling becomes further easier because the installation or maintenance of the elements may be performed at one place.

Preferably, the DC power source DC/DC converter, the battery DC/DC converter, and the AC/DC converter are arranged horizontally side-by-side with a predetermined gap.

With such configuration, since the heat generating first and the second DC/DC converters and the AC/DC converter are arranged side by side, it is possible to enhance heat dissipation. Further, since a heat dissipation plate or a heat dissipation fin is disposed between the converters, heat dissipation property may be increased.

The battery may be disposed so that the battery is not placed above the DC power source DC/DC converter, the battery DC/DC converter, and the AC/DC converter.

Accordingly, the heat dissipation property can be excellently maintained without being lowered.

The battery may be detachably installed in the container.

With such configuration, since the battery is detachable, maintenance is easy when the battery needs to be replaced due to deterioration of the battery or scale-up of the device.

Further, the battery DC/DC converter may be connected to the battery by a connector.

By doing so, since the second DC/DC converter is connected to the external battery by the connector, the battery can be easily removed.

Further, the power distribution device may includes: a control unit for controlling outputs of the DC power source DC/DC converter, the batter DC/DC converter, and the AC/DC converter; a display unit for displaying status of power supply; and a manipulation unit for manipulating an ON/OFF of each of the DC power source, AC power source, and the protection circuit.

With this configuration, since the control unit, the display unit, and the manipulation unit are provided on the outer surface of the container of the power distribution device, workability is excellent.

Furthermore, the power distribution device may include: a first terminal block for connecting a first line to the DC load; and a second terminal block for connecting a second line from the DC power source; wherein at least one of shapes and colors of the first and the second terminal blocks and colors of the first and the second lines are distinguishable from each other.

With such configuration, an erroneous connection can be avoided, and a high-reliability connection can be achieved.

In accordance with a second aspect of the present invention, there is provided a power distribution system including the power distribution device as described above, and a terminal for additionally installing a battery.

Accordingly, a battery having, e.g., a high output capacity is easily added as needed.

The power distribution system may further include battery units each including a battery and a battery DC/DC converter.

Accordingly, the battery can be easily added if necessary.

Further, the power distribution system may include a plurality of the above-described power distribution device.

With this configuration, it is possible to provide a compact power distribution system capable of reliably driving high performance equipments.

In accordance with a third aspect of the present invention, there is provided a power distribution device, including: module devices each including a power converter for converting an input power into a desired output power, wherein the module devices are accommodated in a single container, each having an external dimension having a preset unit size or corresponding to the dimension in which multiple module devices each having the preset unit size are arranged in parallel.

Further, the power distribution device includes a main path electrically connected to the module devices, for including a power line and a communications line, wherein a power is supplied from the module devices to a load via a power supply line connected to the main path; and wherein each of the module devices includes a connection hole connected to the main path, a body detachably installed to the main path via the connection hole, and an internal circuit accommodated in the body and connected to the main path, the internal circuit having a function of autonomously controlling an output power so that a power needed for the load can be supplied to the load and a function of operating in accordance with an external instruction via the communications line.

With such configuration, the power converter is modularized as the module device, including the body having an external size equivalent to a unit size or equivalent to the multiple module devices each having the unit size, the multiple module devices being arranged horizontally side-by-side; and the internal circuit connected to the main path. Accordingly, the additional installation or the replacement of a power converter can be easily performed. Further, there is an advantage in that a specification of the power distribution system may be easily changed depending on the loads.

Furthermore, the internal circuit of the module device has the function of autonomously controlling an output power so that a power equivalent to the power required by each of the loads is supplied to the load. Accordingly, a power can be supplied to the load by a module device only by connecting the module device to the main path. Besides, the internal circuit of the module device also has the function of operating in accordance with an external instruction via the communications line. Accordingly, it is also possible to perform a complicated control based on an external instruction.

In the power distribution device, at least two module devices of the module devices connected to the main path may form a converter group, and a sum of output currents outputted from the module devices of the converter group may be supplied to the load as a total output current; each of the module devices having a power conversion efficiency depending on an amount of the output current, the power distribution device may further include: an efficiency storage unit which previously stores a relationship between an output current and a conversion efficiency for each of the module devices; a pattern storage unit which previously stores allocation patterns each indicating a rule for allocating the total output current to each of the module devices of the converter group; a total output instruction unit for instructing a total output current to be outputted from the converter group; a allotment determination unit for selecting one from the allocation patterns stored in the pattern storage unit as an application pattern using the total output current instructed by the total output instruction unit and the conversion efficiency stored in the efficiency storage unit; and an allocation control unit for controlling the output of each of the module devices so that the total output current is allocated to each of the module devices based on the selected application pattern.

Preferably, the allotment determination unit calculates a sum of input powers of the entire converter group when the output currents are allocated to the module devices of the converter group based on each of the allocation patterns stored in the pattern storage unit, the sum of the input powers being calculated by using the conversion efficiency stored in the efficiency storage unit with respect to each of the allocation patterns. Further, the allotment determination unit may select an allocation pattern having a minimum sum of the input powers as the application pattern.

With this configuration, since the total output current is allocated based on application patterns, power conversion efficiency in all the multiple module devices forming each the converter group is increased as compared with the case where the total output current is not allocated based on application patterns. Consequently, it is possible to reduce a loss during power conversion in the entire power distribution device.

In the power distribution device, each of the module devices of the converter group may be formed of a switching power supply in which a relationship between the output current and the conversion efficiency varies depending on an oscillation control mode thereof, and the allotment determination unit may select the application pattern using the conversion efficiency corresponding to the oscillation control mode.

By doing so, it is possible to select as a application pattern an allocation pattern where a sum of input power is minimum regardless of a oscillation control mode of a module device, and the power conversion efficiency is increased in the multiple module devices included in the converter group as a whole.

Further, the power distribution device may be employed in a power distribution system including solar cells, a battery and a power conditioner having a function of converting a DC power into an AC power, the module devices serving as a power converter may be provided between the battery and the power conditioner. Furthermore, the power converter may be connected to the main path, input powers from the solar cells and the battery to the power conditioner, and reversely flow a surplus power provided in at least one of the solar cells and the battery into a commercial power system via the power conditioner.

With such configuration, since power from solar cells and a battery is inputted to the power conditioner, the power conditioner is shared by the solar cells and the battery. Thus, even when a surplus power is present in the output power from the solar cells and the battery, the surplus power can be made to flow reversely into the commercial power system via the power conditioner.

In the power distribution device, further, the power conditioner may be provided between the solar cells and the commercial power system, and the power converter may be provided between the solar cells and the main path, and the power converter bi-directionally may convert a power between the solar cells and the battery, and reversely flow the surplus power of the battery into the commercial power system via the power conditioner.

In this case, the power converter can perform a bidirectional power conversion between the solar cells and the main path. Thus, the power converter may output the power generated by the solar cells to the main path at normal times and perform the reverse flow of a surplus power into the commercial power system when the battery outputs the surplus power. Further, the power converter provided between the solar cells and the main path may be realized using a single bidirectional module device or two unidirectional module devices.

Effect of the Invention

With the power distribution device of the present invention, when a power is supplied to a DC device from a DC power source such as solar light power generation or a fuel cell, and a commercial power source, the supply of the power can be easily manipulated and can be executed using one unit.

Furthermore, with the power distribution device of the present invention, a power converter can be easily added or replaced because the power converter is modularized as a module device formed of a body having a external dimension equivalent to a unit size, and an internal circuit connected to a main path. Accordingly, there is an advantage in that a specification of the power distribution system can be easily changed depending on the loads.

BRIEF DESCRIPTION OF THE DRAWINGS

The objects and features of the present invention will be apparent from the following description of embodiments when taken in conjunction with the accompanying drawings, in which.

DETAILED DESCRIPTION OF THE PREFERRED EMBODIMENTS

Figure 1:
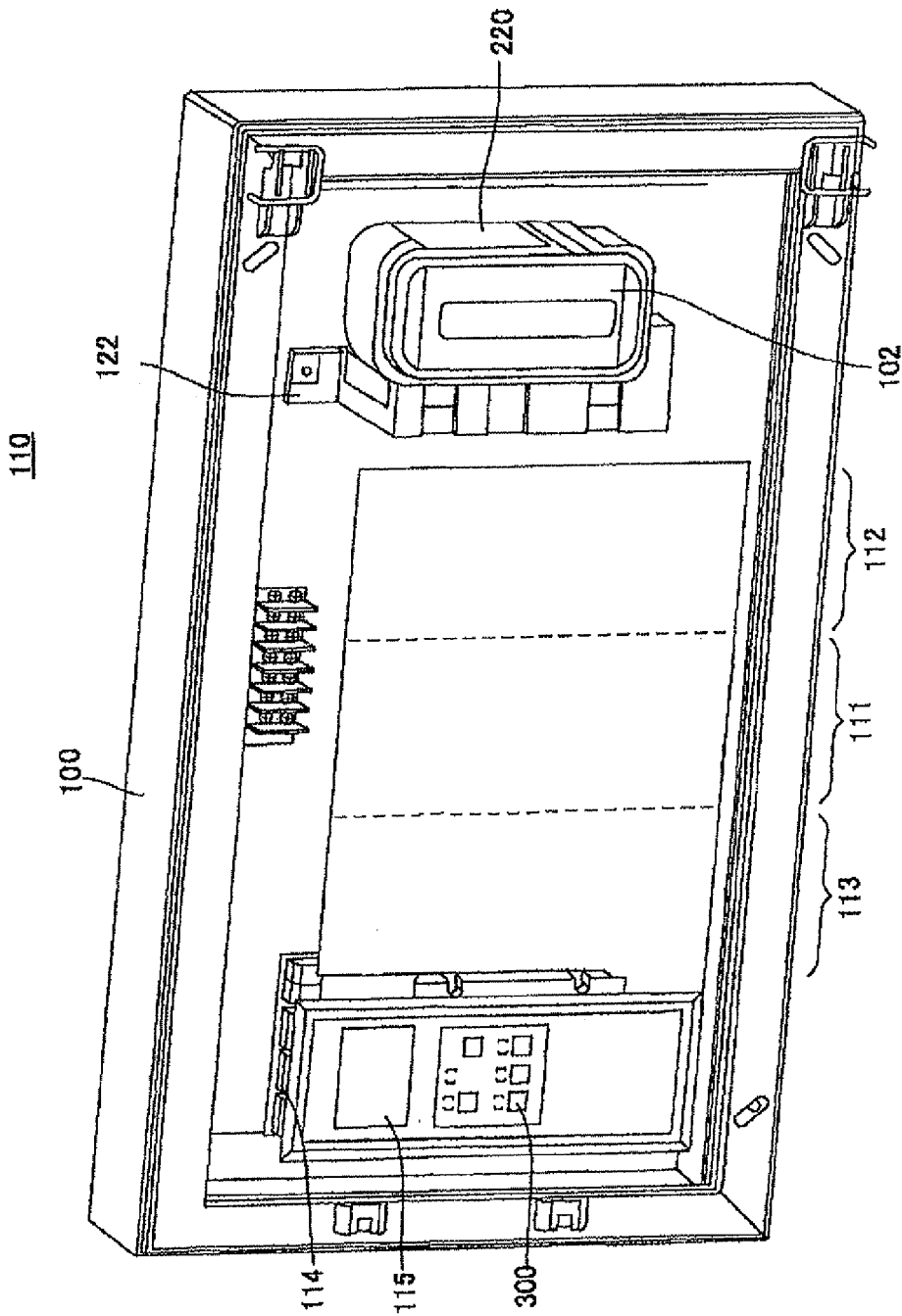
FIG. 1 is a schematic diagram showing an appearance of a power distribution device in accordance with an embodiment 1 of the present invention.

Embodiments of the present invention will be described in detail below with reference to the accompanying drawings that form a part hereof. The same reference numerals will be assigned to the same or similar components throughout the drawings, and redundant descriptions thereof will be omitted.

In the embodiments described below, although a power distribution device in accordance with the present invention is applied to a detached house, the present invention is not limited thereto. The power distribution system in accordance with the present invention may also be applied to each house of a multi-family house or each office of an office building.

Figure 2:
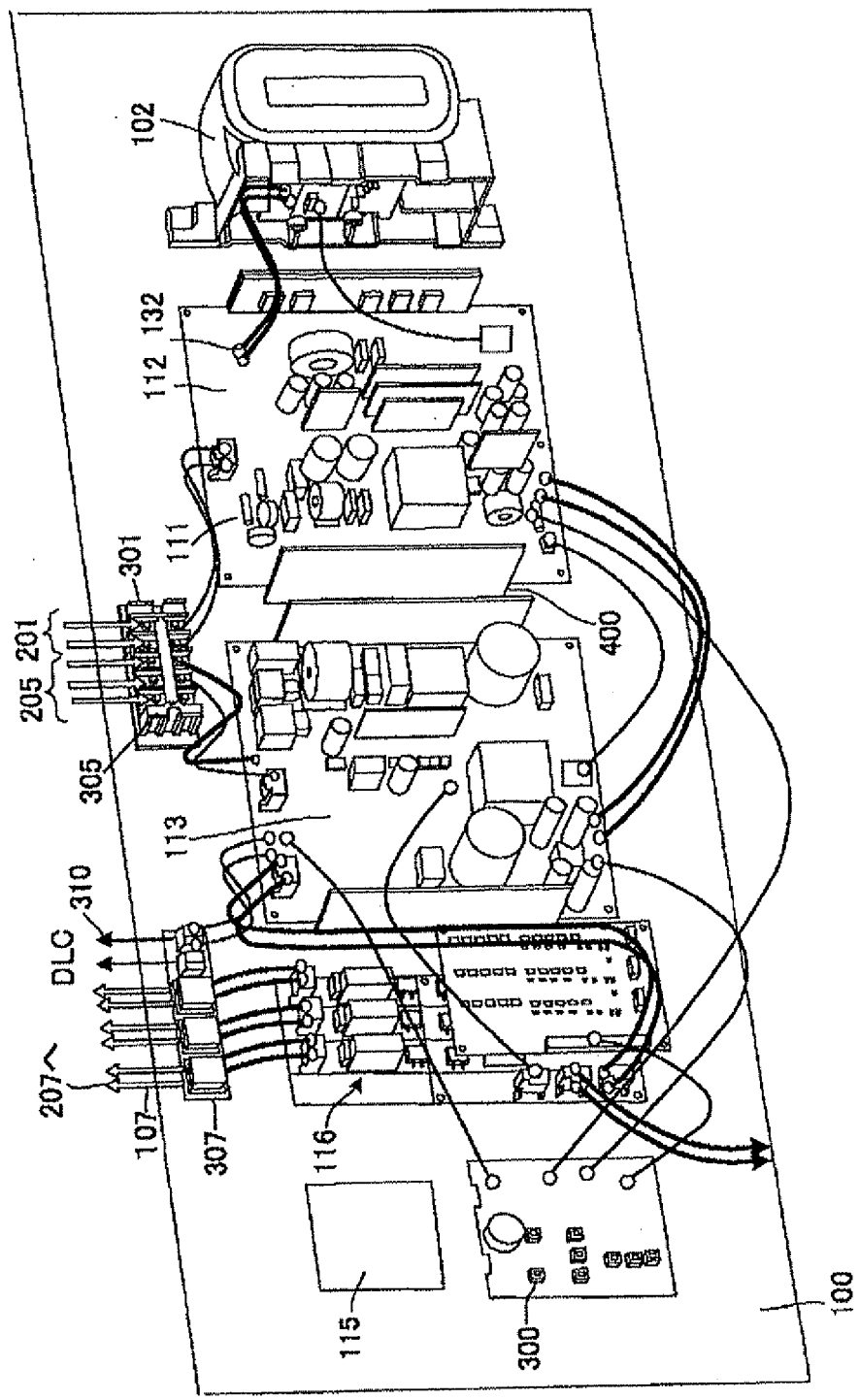
FIG. 2 is a perspective view showing the distribution board of the power distribution device in accordance with the embodiment 1 of the present invention.
Figure 3:
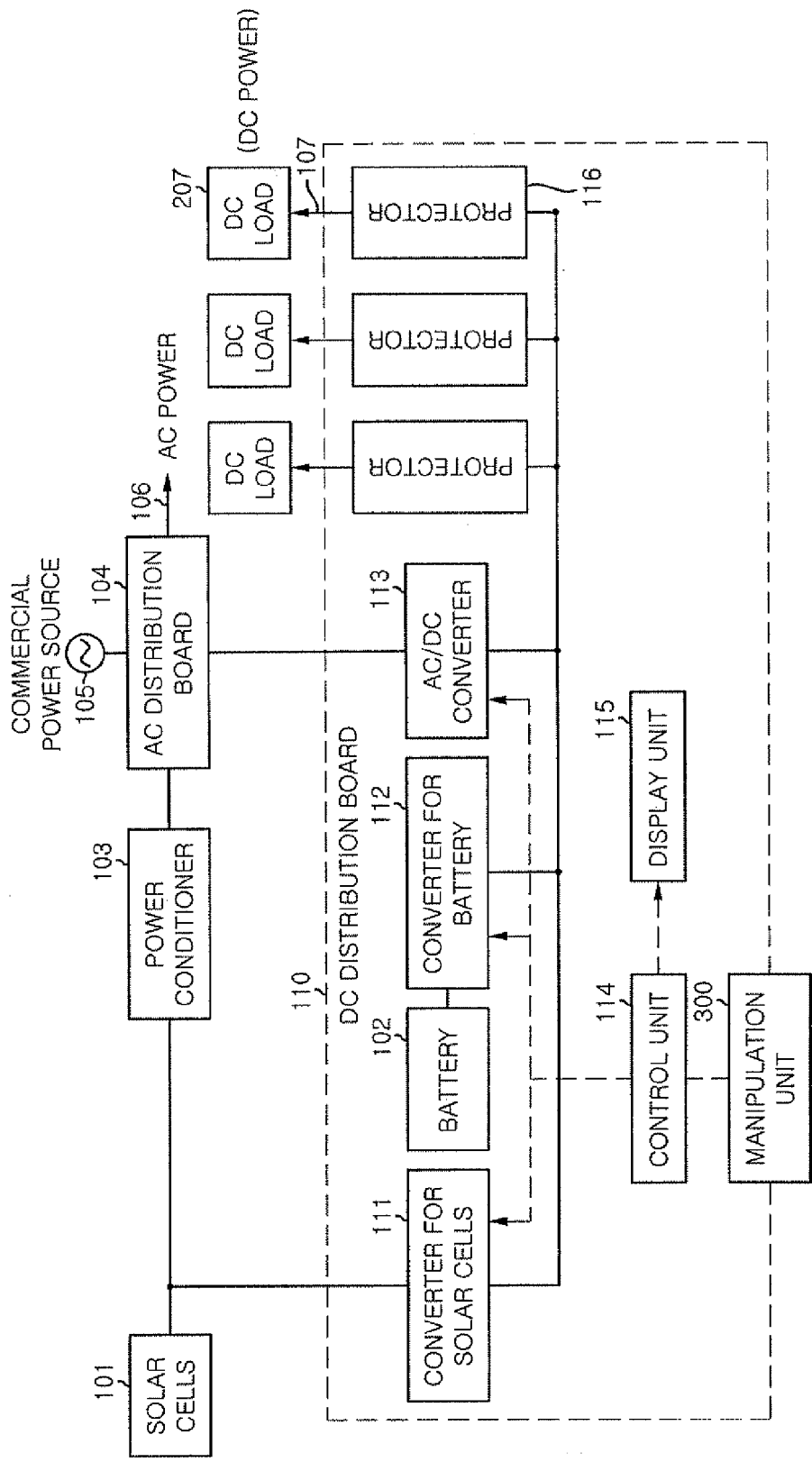
FIG. 3 is a block diagram showing configuration of the power distribution system in accordance with the embodiment 1 of the present invention.

FIG. 1 is a schematic diagram showing the appearance of a power distribution device in accordance with an embodiment 1 of the present invention; FIG. 2 is a perspective view showing the distribution board of the power distribution device in accordance with the embodiment 1 of the present invention; and FIG. 3 is a block diagram showing configuration of the power distribution system in accordance with the embodiment 1 of the present invention.

The power distribution system of the present embodiment is applicable to a hybrid power distribution system that has solar cells and a battery and can distribute an AC and DC power.

The power distribution device is provided as a DC distribution board 110 (see FIG. 3) and accommodated in a container 100. The power distribution device, as shown in FIGS. 1 to 3, includes a first DC/DC converter (hereinafter, referred to as a "solar cell converter") 111 connected to solar cells 101 as a DC power source, an AC/DC converter 113 connected to a commercial power source (an AC power system) 105 as an AC power source, a battery 102, and a second DC/DC converter (hereinafter, referred to as a "battery converter") 112 connected to the battery 102.

The power distribution device further includes protectors 116, that is, protection circuits connected to the solar cell converter 111, the battery converter 112 and the AC/DC converter 113, and power distribution paths 107 for DC load drawn from the container 100 that defines the DC distribution board 110. In the embodiment, although the protectors 116 is connected to all of the solar cell converter 111, the battery converter 112 and the AC/DC converter 113, the protectors may be connected to at least one of the solar cell converter 111, the battery converter 112 and the AC/DC converter 113.

The solar cell converter 111, the battery converter 112, and the AC/DC converter 113 are arranged horizontally side-by-side with a predetermined gap therebetween, and heat dissipation fins 400 are provided between the solar cell converter 111, the battery converter 112, and the AC/DC converter 113, as shown in FIG. 2.

As shown in FIG. 1, the battery 102 is accommodated in a battery casing 220 and is detachably installed to the container 100 using a fixing unit 122. Further, the battery may be directly connected to the board of the battery converter 112, and may be connected to the board of the battery converter 112 using a connector 132. In such a connector connection, maintenance becomes easier when the battery needs to be replaced due to deterioration or scale-up. Furthermore, installation and separation are easy because a connection to an external battery is performed using the connector connection. In addition, the battery converter 112 may also be connected to the board of the distribution board using a connector, as will be described later.

In the meantime, a power distribution system using the power distribution device, as shown in FIG. 3, includes an AC distribution board 104 for distributing an AC power to an AC load device (not shown) via an AC power distribution path 106, and the DC distribution board 110 as a DC power distribution device for distributing a DC power to DC loads via the DC power distribution paths 107. The AC distribution board 104 has input terminals connected to the commercial power source 105 (the AC power source) and a power conditioner 103 and has output terminals connected to the AC power distribution path 106 and the DC distribution board 110. The AC distribution board 104 branches an AC power outputted from the commercial power source 105 or the power conditioner 103 and outputs AC power to the AC power distribution path 106 and the DC distribution board 110.

The solar cells 101 and the battery 102 are provided as the DC power sources of the power distribution system. In the embodiment, the battery 102 is installed on the DC distribution board 110, but the battery 102 may be externally added and used as an additional power source. An example in which the battery 102 is externally added will be described later. The solar cells 101 receive a solar light, generate a solar power by converting the energy of the solar light into electricity by the photovoltaic effect, and output a DC power, and form a part of a solar power generation apparatus as an example of a DC power generation equipment.

The battery 102 includes a secondary battery capable of being charged with a DC power and discharging the DC power. The DC distribution board 110 has input terminals connected to the solar cells 101 and the AC distribution board 104, and has output terminals connected to the DC power distribution paths 107. The DC distribution board 110 includes the solar cell converter 111, the battery converter 112, and the AC/DC converter 113, as output converters. Further, the DC distribution board 110 includes a control unit 114 and a display unit 115.

An output line of the solar cells 101 branches into two, and is connected to the power conditioner 103 and the solar cell converter 111 in the DC distribution board 110. The power conditioner 103 converts a DC power outputted from the solar cells 101 into an AC power synchronized with the phase of the commercial power source 105. The power conditioner 103 outputs the AC power to reversely flow into the commercial power source 105.

The solar cell converter 111 includes a DC/DC converter. The converter 111 converts a DC power outputted from the solar cells 101 into a DC power having a desired voltage level, and outputs the DC power having the desired voltage level. The battery converter 112 includes a DC/DC converter. The converter 112 converts a DC power outputted from the battery 102, into a DC power having a desired voltage level, and outputs the converted DC power to charge the battery 102. The AC/DC converter 113 converts an AC power supplied from the AC distribution board 104 into a DC power having a desired voltage level, and outputs the DC power.

The power conditioner 103 includes a boosting chopper circuit (not shown) for boosting the DC power outputted from the solar cells 101, an inverter (not shown) for converting the DC power boosted by the boosting chopper circuit into a sinusoidal AC power synchronized with the phase of the AC power system, an inverter control circuit (not shown) for controlling the inverter to adjust the AC power, and a grid connection protection device.

Like a so-called household distribution board (a household board), the AC distribution board 104 is provided in a box having a door, and includes a main breaker (not shown) whose primary side is connected to the commercial power source 105, and multiple branch breakers into which a conduction bar (not shown) branches. The conduction bar is connected to a secondary side of the main breaker. Further, an output line of the power conditioner 103 is connected to the AC distribution board 104 and the commercial power source 105 in the box. Furthermore, the AC power distribution path 106 is connected to the secondary sides of the branch breakers, so that the AC power is supplied to the AC load device within the house via the AC power distribution path 106.

Like the AC distribution board 104, the DC distribution board 110 is accommodated in the container 100 having a door. Further, the output of the commercial power source 105 via the AC distribution board 104 and the output of the solar cells 101 are respectively inputted to the AC/DC converter 113 and the DC/DC solar cell converter 111, so that the DC power is supplied to DC load devices 207 via the power distribution paths 107.

In the DC distribution board 110, each of the solar cell converter 111 and the battery converter 112 includes, e.g., a switching regulator, and converts the voltage level of the DC power outputted from each of the solar cells 101 and the battery 102 into a desired voltage level. The solar cell converter 111 and the battery converter 112 perform a constant voltage control (feedback control) by detecting an output voltage and increasing or decreasing the output voltage so that the detected output voltage becomes identical to a target voltage.

The AC/DC converter 113 includes a switching regulator, an inverter and the like, rectifies an AC voltage and outputs a DC voltage. The AC/DC converter 113 converts the AC power outputted from the AC distribution board 104 into a DC power having a desired voltage level by performing a constant voltage control on the output voltage through feedback control. The output terminals of the solar cell converter 111, the battery converter 112, and the AC/DC converter 113 are connected in parallel to the DC power distribution paths 107 via the protectors 116 such as current fuses.

In the DC power distribution paths 107, Protection circuits (not shown) may be installed externally when necessary. Thus, from among the DC powers having desired voltage levels converted by the solar cell converter 111, the battery converter 112 and the AC/DC converter 113, a DC power is supplied to DC load devices 207 via the DC power distribution paths 107.

The control unit 114 is formed of an information processing device including, e.g., a microcomputer, and controls the operations of the parts of the DC distribution board 110. The control unit 114 controls the turning ON/OFF and an output voltage of each of the solar cell converter 111, the battery converter 112, and the AC/DC converter 113. The control unit 114 also controls the display unit 115.

The display unit 115 includes a liquid crystal display device, and displays a variety of information including an operating status of the DC distribution board 110, using characters, numerals, and images, based on an instruction from the control unit 114. Further, a manipulation unit 300 is provided through which an operating status, an abnormal state, measurement items, a timer and the like, are set and an abnormal history is displayed.

Here, the abnormal history may include a voltage of the solar cells, a voltage of the battery, an AC voltage, and an output power immediately before an abnormality occurs, and the time when the abnormality occurred. Further, the above settings may be performed using not only a manipulation unit provided in the DC distribution board 110 but also a remote manipulation unit (a remote controller or a personal computer in the house), or may be performed through a DLC (DC power line communications) terminal 310.

Meanwhile, the power conditioner 103 may have a normal reverse flow function for a power generated by the solar light, a night battery charging function, and a day battery discharging function. Accordingly, the power conditioner 103 may usefully utilize both the power generated using the solar light and the power charged at night.

Further, since the reverse flow of the power discharged from the battery into an AC power system is not permitted, it is necessary to change the discharged power depending on a use situation of the load devices. For example, a power flowing in the power system may be detected by a power reception detection unit provided in a reception point of the power system, and a control for preventing the reverse flow may be performed so that no power is reversely flowed from the battery.

With this configuration, handling is easy because elements necessary to supply a power from the DC power source are formed into a single unit as the DC distribution board and can be accommodated in the container. Further, handling becomes easier because installation and maintenance can be performed in one place.

In the present embodiment, the solar cell converter 111, the battery converter 112, and the AC/DC converter 113 which are accompanied by the generation of heat are arranged in parallel to each other in the same plane, as shown in FIGS. 1 and 2, thereby achieving excellent heat dissipation. Besides, since heat dissipation plates or the heat dissipation fins 400 are disposed between the converters, it is possible to further improve the heat dissipation.

Further, the battery 102 is disposed so that it is not placed over any of the solar cell converter 111, the battery converter 112, and the AC/DC converter 113. Accordingly, the heat dissipation of the solar cell converter 111, the battery converter 112, and the AC/DC converter 113 can be excellently maintained without being hindered by the existence of the battery 102.

Furthermore, the battery can be freely mounted on and removed from the container. Accordingly, maintenance is easy even when the battery needs to be replaced due to deterioration or scale-up.

In the present embodiment, the control unit 114 controls which one of the solar cell converter 111, the battery converter 112, and the AC/DC converter 113 outputs power, and the display unit 115 displays the power supply status. Further, by using the manipulation unit 300, the ON/OFF of the DC or AC power source or of the protectors 116 as the protection circuits can be controlled. Therefore, operability is excellent.

In the present embodiment, the DC/DC battery converter 112 is connected to the battery 102 by the connector. Accordingly, the DC/DC battery converter 112 can be easily mounted and removed even when it is connected to an external battery. Further, even when a battery needs to be replaced due to deterioration or scale-up, maintenance is easy because the battery 102 is detachably connected to the DC/DC battery converter 112.

In order to avoid erroneous connections, it is preferred that a first terminal block 307 connected to the DC power distribution paths 107 for the DC load devices 207, a second terminal block 301 connected to a power distribution path 201 from the DC power source, and a third terminal block 305 connected to the AC power distribution path 205 from the AC power source are different from each other in shape or color, and colors of the power distribution paths are distinguishable from each other. If the shapes of the terminal blocks are different such that the terminal blocks cannot be erroneously connected, it becomes safer.

Embodiment 2

An embodiment 2 of the present invention in which an additional battery is installed will be described below.

Figure 4:
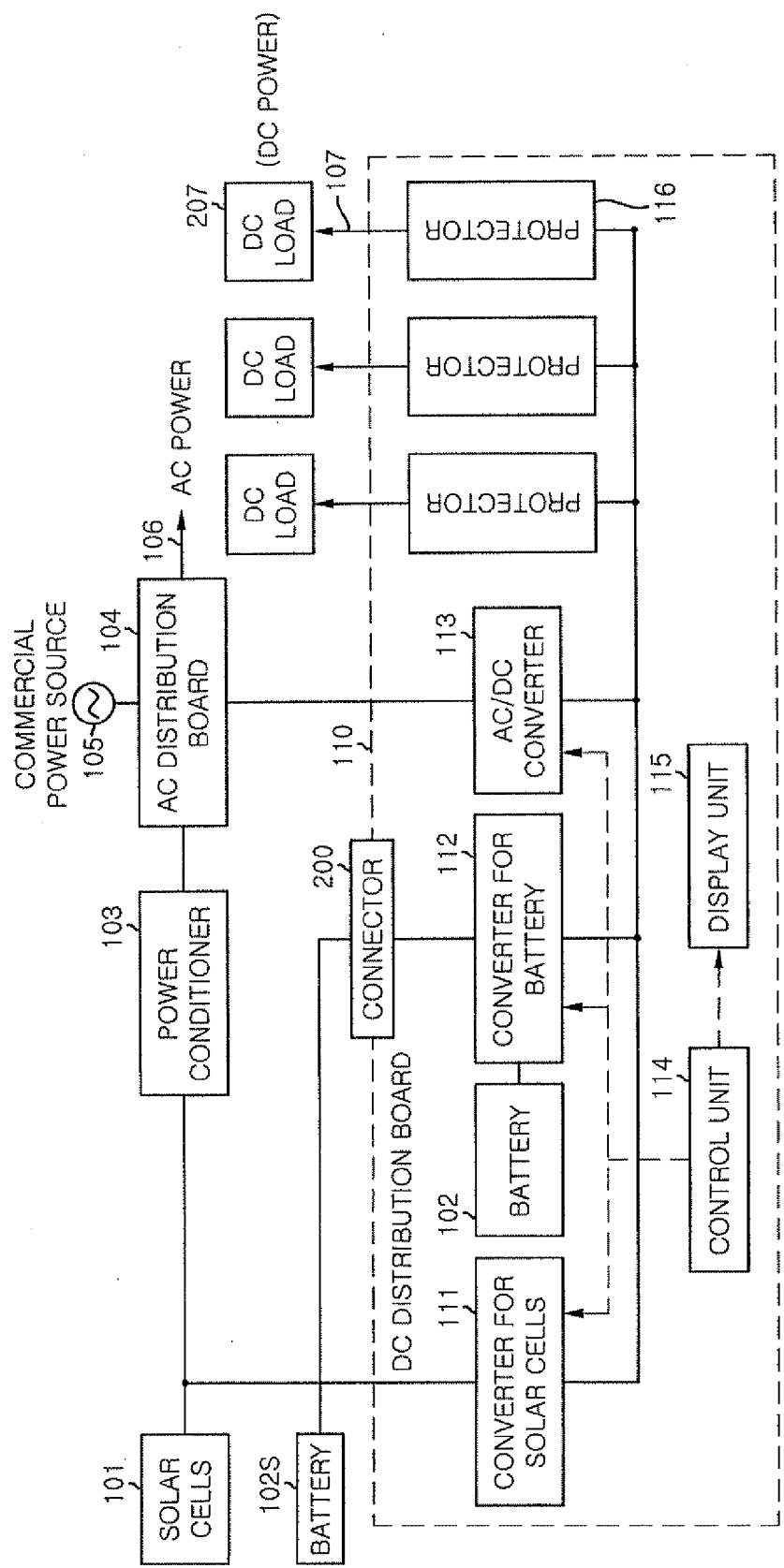
FIG. 4 is a block diagram showing configuration of a power distribution system in accordance with an embodiment 2 of the present invention.

FIG. 4 shows the block diagram of a power distribution system in accordance with the embodiment 2. As shown in FIG. 4, a connector 200 for a battery may be provided in a DC distribution board 110, and an external battery 102S may be connected to the DC distribution board 110 via the connector 200 for a battery. Since the other elements of the power distribution system shown in FIG. 4 are the same as those of the power distribution system shown in FIG. 3, descriptions thereof will be omitted. In the present embodiment, the manipulation unit is not provided, and manipulation is performed through the DLC terminal using a remote manipulation unit (not shown).

With such configuration, if a capacity of solar cells is increased by, e.g., addition and renovation, an additional battery may be installed in accordance with the capacity of the solar cells.

Embodiment 3

Next, an embodiment 3 of the present invention where an additional battery unit is installed will be described below.

Figure 5:
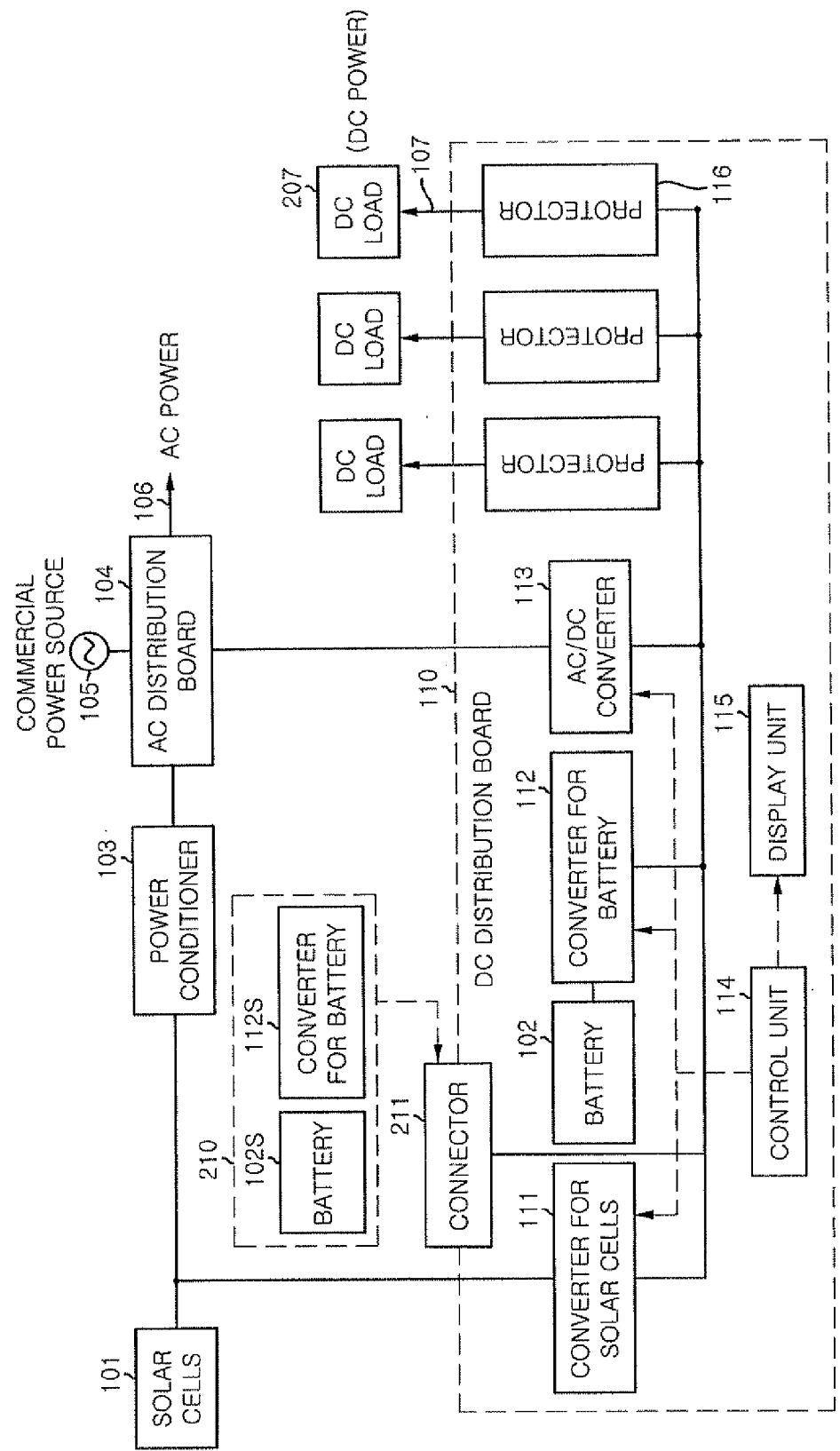
FIG. 5 is a block diagram showing configuration of a power distribution system in accordance with an embodiment 3 of the present invention.

Although only the battery is added in the embodiment 2, a battery unit 210 including a battery converter 112S and the external battery 102S is provided as a single unit and connected to a DC distribution board 110 in the present embodiment. FIG. 5 shows a block diagram of a power distribution system in accordance with the present embodiment. As shown in FIG. 5, a connector 211 is provided in the DC distribution board 110, such that the battery unit 210 is externally connected to the DC distribution board 110 via the connector 211.

If the battery unit 210 is externally provided as described above, the battery 102 and the battery converter 112 within the DC distribution board 110 may be omitted. Since the other elements of the power distribution system shown in FIG. 5 are the same as those of the power distribution system shown in FIG. 3, descriptions thereof will be omitted.

With such configuration, even when the capacity of the battery converter is insufficient, an additional battery unit can be installed, and therefore the limitations imposed on a design can be significantly reduced.

As described above, in accordance with the present embodiment, the battery unit including the battery and the DC/DC battery converter is detachably provided, and the installation of an additional battery becomes easy. Furthermore, since the connector 211 is provided as a terminal for additional battery, it becomes easier to install an additional battery such as a high capacity battery whenever necessary.

Further, the power distribution system in accordance with the present invention may have a configuration which includes a plurality of power distribution systems constituted by the combination of the power distribution systems of the embodiments 1 to 3.

Embodiment 4

Figure 6:
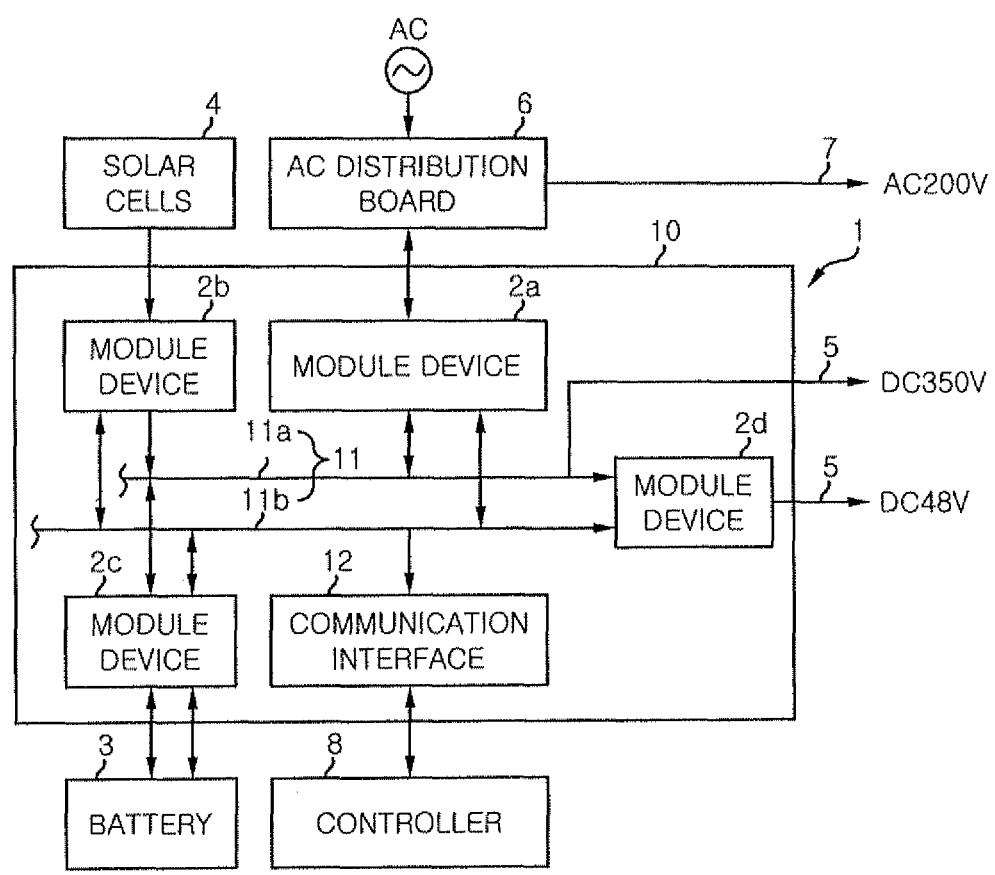
FIG. 6 is a block diagram showing configuration of a power distribution system in accordance with an embodiment 4 of the present invention.
Figure 7:
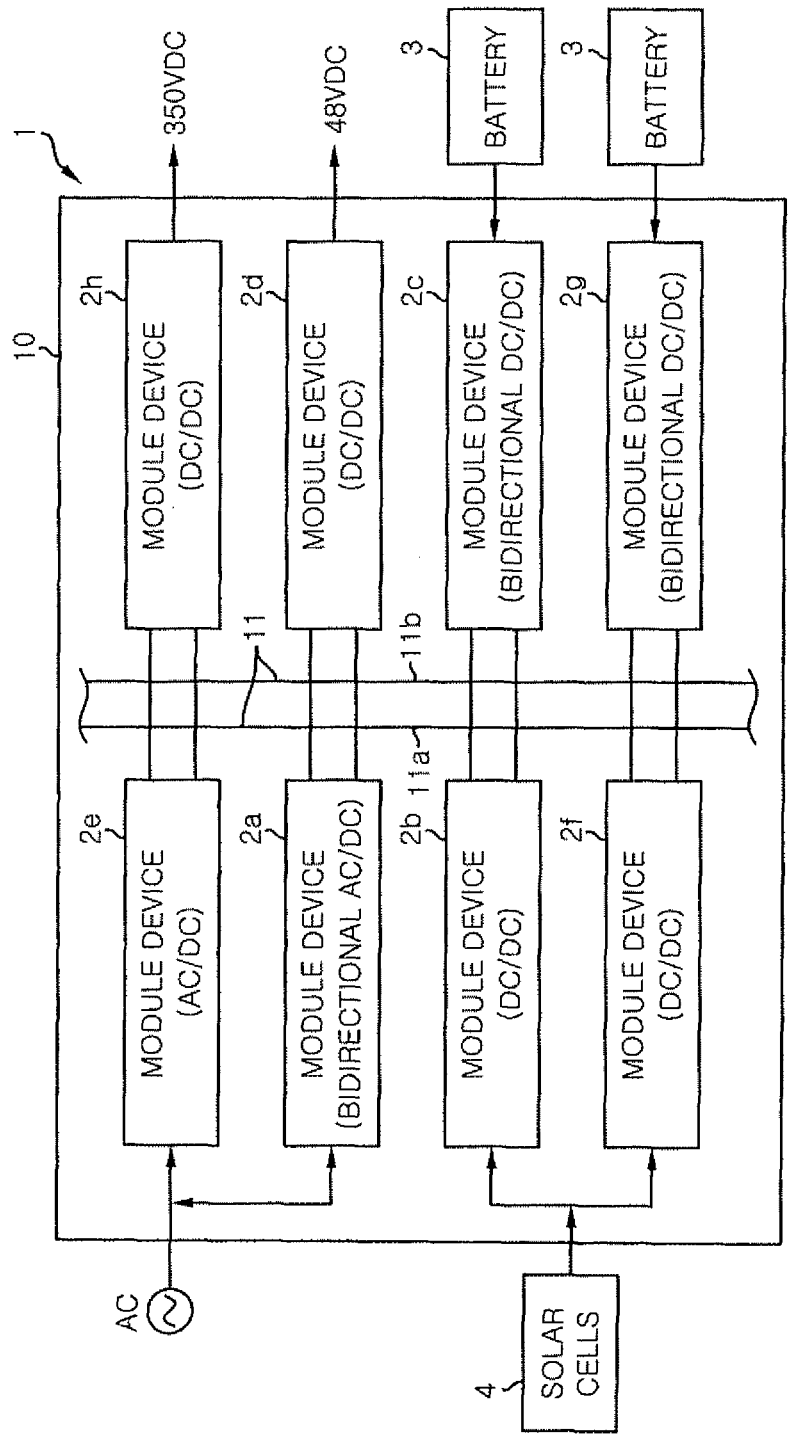
FIG. 7 is a schematic block diagram showing another configuration example of the power supply apparatus in the power distribution system shown in FIG. 6.

A power distribution system in accordance with an embodiment 4 of the present invention will be described below with reference to FIGS. 6 to 9. As shown in FIG. 6, the power distribution system of the embodiment 4 includes a power supply apparatus 1 (a power distribution device) which converts a DC power from a battery 3 and solar cells 4 and an AC power from a commercial power source AC into a desired DC power and outputs the converted DC power, and a controller 8 provided in the outside of the power supply apparatus 1. The power distribution device may further include the battery 3, and the display unit and the manipulation unit (not shown) described in connection with the embodiment 1. The battery 3, the display unit, and the manipulation unit may be accommodated in the container 100 shown in FIG. 1.

The power distribution system supplies a current outputted from the power supply apparatus 1 to multiple loads (not shown) via power supply lines 5. The loads connected to the power supply lines 5 are DC loads driven by DC power, e.g., LED illuminations or alarms in a house. Further, an AC power supply line 7 is connected to the commercial power source AC via an AC distribution board 6, and an AC load (not shown) driven by an AC power are connected to the power supply line 7. Accordingly, a power can be supplied to both the DC loads and the AC load.

The power supply apparatus 1 includes power converters which converts respective input powers into desired output powers. In the present embodiment, the power converters include a bidirectional AC/DC converter provided between the commercial power source (the AC distribution board 6) AC and the power supply lines 5 for converting an AC power into DC power and vice versa, a DC/DC converter for stepping up or down the output of the solar cells 4, a bidirectional DC/DC converter for charging and discharging the battery (a secondary battery) 3, and a DC/DC converter for stepping down a voltage.

The power supply apparatus 1 is accommodated in a board unit 10. Specifically, power converters forming a part of the power supply apparatus 1 as described above are disposed in the board unit 10 as module devices 2a to 2d (hereinafter, simply referred to "module devices 2" if they are not specially distinguished from one another) and the module devices 2 are connected to bus lines (main paths) 11 provided within the board unit 10. Here, the DC power supply lines 5 are divided into two systems of a high voltage system (e.g., DC 350 V) and a low voltage system (e.g., DC 48 V). Further, the power supply line 5 of the high voltage system is directly connected to the bus line 11, and the power supply line 5 of the low voltage system is connected to the bus line 11 via a DC/DC step-down converter as the module device 2d.

Figure 12:
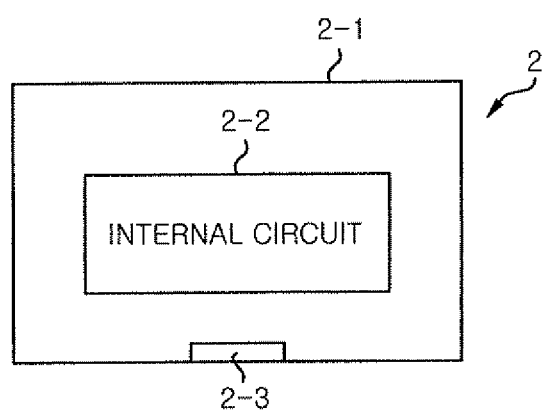
FIG. 12 is a diagram showing the appearance of the module device used in the power distribution system shown in FIG. 12.

In the present embodiment 4, all of the module devices 2 included in the power supply apparatus 1 have the same external dimension and shape as shown in FIG. 12. For example, an internal circuit 2-2 is installed in a body 2-1 having a preset unit dimension in respective module devices. The board unit 10 includes further an installation space (not shown) where a module device 2 having a unit dimension may be additionally installed, and a connection part (not shown) through which the module device 2 is connected to a bus line 11.

Further, a connection part 2-3 for connecting to the bus line 11 is provided at the body of the module device 2, and the connection parts have a common shape and arrangement in all the module devices 2. Thus, any module device 2 may be detachably attached in an empty installation space of the board unit 10, and can be connected to the bus line 11.

In addition to the connection part for the bus line 11, each of the module devices 2 is provided with a connection terminal (not shown) for connecting to the commercial power source (the AC distribution board 6) AC, the solar cells 4, or the battery 3. Accordingly, lines from the AC distribution board 6, the solar cells 4, and the battery 3 are connected to the respective connection terminals of the module devices 2 in the board unit 10.

The bus line 11 includes a power supply line 11a and a communications line 11b. In each of the module device 2, the connection part may be provided separately or commonly for the power line 11a and the communications line 11b. In the present embodiment, the power supply apparatus 1 includes a communications interface 12 connected to the communications line 11b of the bus line 11 in the board unit 10. The communications interface 12 is connected to an external device. Accordingly, communications is possible between the external device and each of the module devices 2 connected to the communications line 11b. Further, voltage of DC 350 V±10 V is supplied to the power line 11a.

The internal circuit of each of the module devices 2 is connected to the bus line 11, and has the function of autonomously controlling an output power so that a power required from a load is supplied to the load and the function of operating based on an instruction inputted from the outside via the communications line 11b. That is, in the power supply apparatus 1, when the module devices 2 are connected to the bus line 11, the module devices 2 independently start operating without having to do set specially, so that a power is supplied to the load. Further, the operation of each of the module devices 2 may also be externally controlled through communications with a controller via the communications interface 12, which will be described later.

In the present embodiment, while operating in an autonomous control, the module device 2 monitors a voltage on the power line 11a in order to check a demand from a load and determines the amount and direction of the output based on the voltage. That is, the module device 2 determines the amount and direction of the output by estimating that a power supplied to the load is insufficient when the voltage on the power line 11a drops and a surplus power is present in the power supplied to the load when the voltage rises.

For example, the module device 2a provided between the commercial power source AC and the power supply line 5 and formed of an AC/DC converter converts an AC power from the commercial power source AC into a DC power and outputs the DC power when voltage on the power line 11a is lower than 350 V. The module device 2a converts a DC power into an AC power to reversely flow (electric power selling) to the commercial power source AC when the voltage on the power line 11a is 350 V or higher.

The module device 2c formed of a DC/DC converter for performing the charging and discharging of the battery 3 discharges the battery 3 when the voltage on the power line 11a is below a threshold value (e.g., 350 V) and charges the battery 3 when the voltage on the power line 11a is the threshold value or higher. The module device 2b formed of a DC/DC converter for stepping up or down an output of the solar cells 4 performs Maximum Power Point Tracking (MPPT) control. Since the output of the solar cells 4 generally varies depending on a time zone, the operational characteristic of each module device 2 may be changed according to the time zone.

As described above, with the power supply apparatus 1, since a variety of the power converters can be accommodated in and connected to the board unit 10 as the module devices 2. Therefore, a power converter may be added as an element in accordance with the capacity of a load as shown in, for example, FIG. 7. As compared with the example of FIG. 6, the example of FIG. 7 further includes a module device 2e serving as an AC/DC converter for the commercial power source AC, a module device 2f serving as a DC/DC converter for the solar cells 4, a module device 2g serving as a bidirectional DC/DC converter for the charging and discharging of the battery 3, and a module device 2h serving as a DC/DC converter for the power supply line 5 of the high voltage system.

With the power supply apparatus 1 of the present embodiment 4, the additional installation or replacement of the module devices 2 may be easily made when a load is added or replaced. Further, the specification of the power supply apparatus 1 may be easily changed in accordance with a load. Accordingly, when a load is added or replaced, the entire power distribution system need not to be replaced, i.e., the existing power distribution system need not to be discarded as in the prior art, thereby suppressing a rise in expenses.

(Invention 2)

Further, although all the module devices 2 have been described to have a common external unit dimension, the present invention is not limited thereto. At least one of the module devices 2 may have a dimension corresponding to two or more module device 2 having the unit dimension. In this case, such a module device 2 may be attached to an installation space corresponding to two or more module devices 2 each having the unit dimension.

Referring to FIG. 6, from among the multiple module devices 2a to 2d attached to the board unit 10, the module devices 2a, 2b, and 2c serve as a converter group and output a power to the power line 11a of the bus line 11. In the present embodiment, although the converter group includes three module devices, it may include two or more module devices. The sum of the output currents outputted from the module devices 2a, 2b, and 2c forming the converter group is supplied to loads as the total output current.

Figure 8:
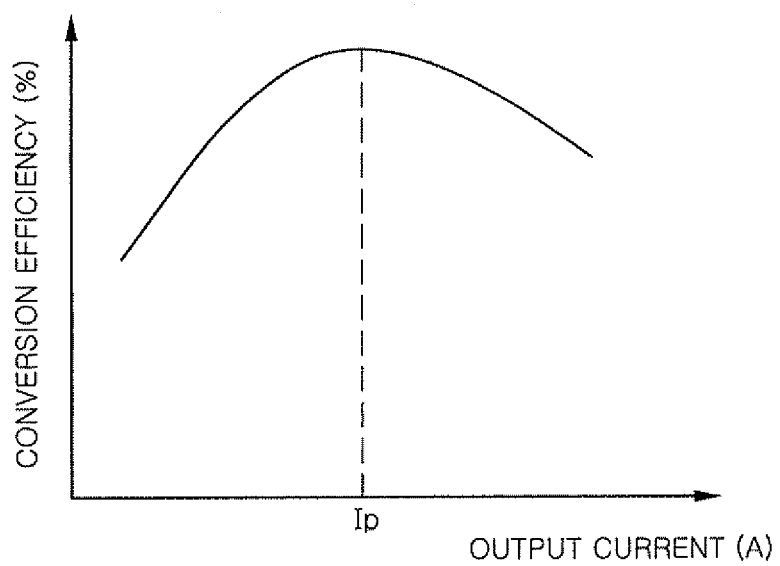
FIG. 8 is a conversion efficiency-output current characteristic diagram of the module device used in the power distribution system shown in FIG. 6.

In the present embodiment, each of the module devices 2a, 2b, and 2c is a so-called switching power source device, and has a conversion efficiency-output current characteristic in which power conversion efficiency changes in accordance with the amount of output current, as shown in FIG. 8. Further, each of the module devices 2a, 2b, and 2c is configured to have a conversion efficiency-output current characteristic (a conversion efficiency curve) in which the conversion efficiency becomes maximum when the output current has a maximum efficiency value Ip smaller than a rating current value.

That is, the power conversion efficiency of the module device 2 becomes maximum when the output current has the maximum efficiency value Ip, and decreases as the output current increases or decreases from the maximum efficiency value Ip. For the sake of simplification, it is assumed that all the module devices 2a, 2b, and 2c included in the converter group have a same conversion efficiency-output current characteristic.

Furthermore, it is hereinafter assumed that the output of the solar cells 4 and the remaining capacity of the battery 3 are sufficient. For example, an output of the solar cells 4 actually decreases at night and, accordingly, a current outputted from the module device 2b as a DC/DC converter for stepping up or down the output from the solar cells 4 is restricted within a limit based on the output of the solar cells 4. That is, the outputs of the module devices 2b and 2c is limited based on the output of the solar cells 4 and the remaining capacity of the battery 3, respectively, and a shortfall in the outputs is made up for by the module device 2a.

Referring to FIG. 6, the controller 8 provided externally is connected to the communications line 11b of the bus line 11 via the communications interface 12. The controller 8 monitors the current outputted from each module device 2, the remaining capacity of the battery 3, and the power consumed by a load, and controls the operations of the respective module devices 2a, 2b, and 2c. To this end, the controller 8 is provided with a communications function that enables data transmission via the communications interface 12 between the module devices 2a, 2b, and 2c.

Figure 9:
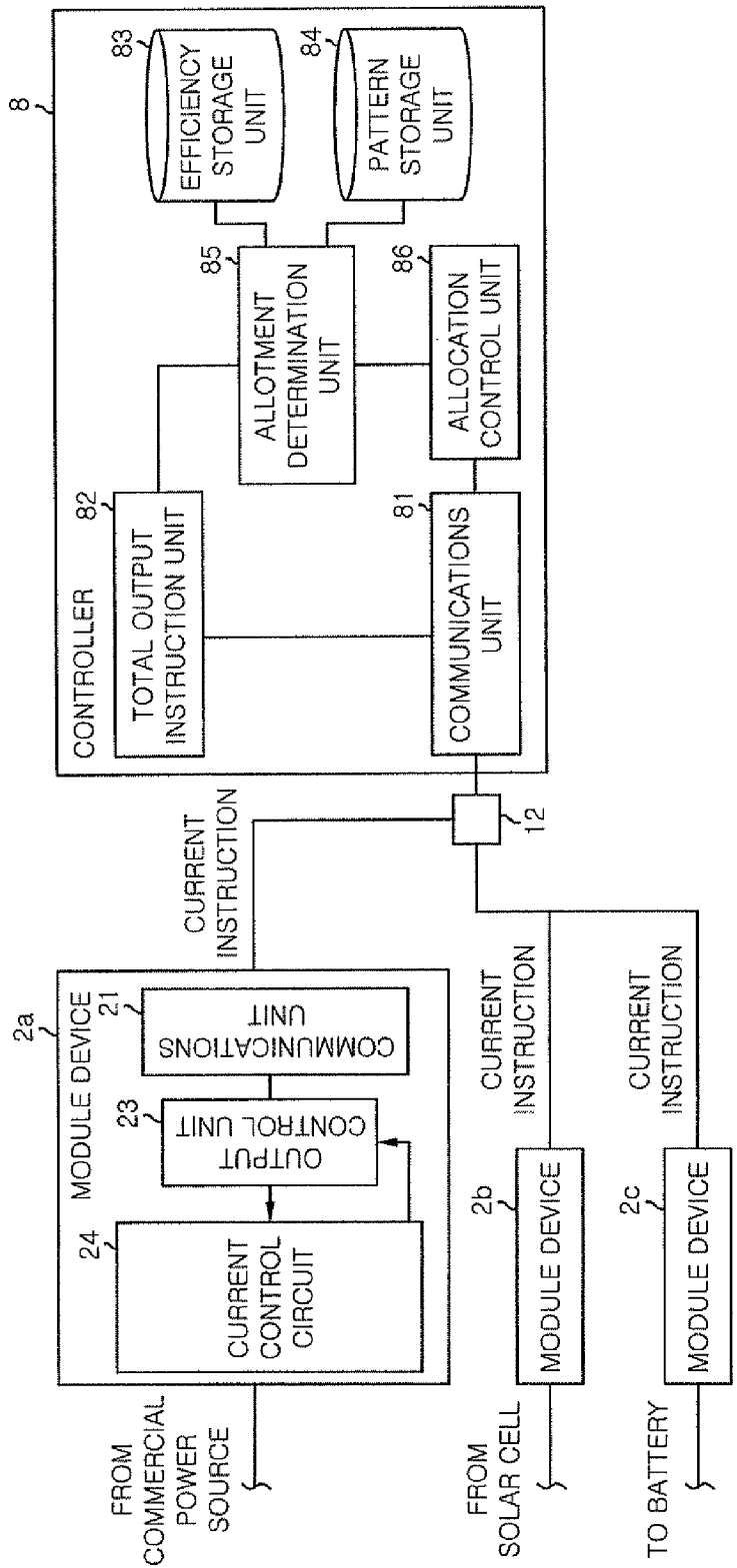
FIG. 9 is a schematic block diagram of principle parts of the power distribution system shown in FIG. 6.

Configurations of the controller 8 and the module devices 2a, 2b, and 2c are described below with reference to FIG. 9.

Each of the module devices 2a, 2b, and 2c includes a communications unit 21 for communicating with the controller 8, a current control circuit 24 for converting an input power into a desired power and outputting the desired power, and an output control unit 23 for performing a feedback control on the current control circuit 24. In FIG. 9, an internal configuration of the module device 2a is shown, and the other module devices 2b and 2c have the same configuration as the module device 2a.

The controller 8 includes a communications unit 81 for communicating with the module devices 2a, 2b, and 2c; and a total output instruction unit 82 for determining a total output current that needs to be outputted from the converter group. The total output instruction unit 82 determines a total output current that needs to be outputted from the module devices 2a, 2b, and 2c of the converter group based on the remaining capacity and charging/discharging ability of the battery 3, the operating status (the amount of power generation) of the solar cells 4, and the current consumed by a load, which are obtained via the communications unit 81.

Further, the controller 8 includes an efficiency storage unit 83 for previously storing a correspondence between a conversion efficiency and an output current with respect to each of the module devices 2a, 2b, and 2c; and a pattern storage unit 84 for previously storing a plurality of allocation patterns indicating rules of allocating a total output current to the module devices 2a, 2b, and 2c. Furthermore, the controller 8 includes a allotment determination unit 85 for determining which allocation pattern among the multiple allocation patterns stored in the pattern storage unit 84 is used in allocating the total output current; and an allocation control unit 86 for issuing an instruction to allocate the total output current according to the allocation pattern selected by the allotment determination unit 85.

In the present embodiment, there is stored an efficiency table such as Table 1 for indicating the correspondence between the output current and the conversion efficiency based on the conversion efficiency-output current characteristic shown in FIG. 8. In Table 1, power conversion efficiencies corresponding to output currents are shown as the output currents increase by a pitch of 0.1 A up to the rating current value (e.g., 4.0 A) of the module devices 2a, 2b, and 2c. In the present embodiment, when output current from each of the module devices 2a, 2b, and 2c is a maximum efficiency value Ip, e.g., 2.0 A, the power conversion efficiency of each of the module devices 2a, 2b, and 2c reaches a maximum (75%). A description is now given based on Table 1 of the efficiency table.

TABLE 1

| | | OUTPUT CURRENT | | | | | |
|---|---|---|---|---|---|---|---|
| | | ... | 0.5 A | ... 1.0 A | ... 2.0 A | ... | 4.0 A |
| MODULE | 2a | ... | 40% | ... 70% | ... 75% | ... | 70% |
| DEVICE | 2b | ... | 40% | ... 70% | ... 75% | ... | 70% |
| | 2c | ... | 40% | ... 70% | ... 75% | ... | 70% |

The allocation patterns stored in the pattern storage unit 84 designates how the total output current from the converter group is allocated to the respective multiple module devices 2a, 2b, and 2c included in the converter group when the total output current is outputted. That is, the allocation pattern represents the rule for determining an amount of an output current to be outputted from each of the module devices 2a, 2b, and 2c included in the converter group in order to obtain a desired total output current from the converter group.

In the present embodiment 4, the pattern storage unit 84 stores six allocation patterns, e.g., No. 1 to No. 6, as shown in Table 2 below. Further, the allocation patterns of No. 1 to No. 6 are only an example, and one or more of the allocation patterns may be used as allocation patterns or another allocation pattern may be used.

TABLE 2

| PATTERN | | | ALLOTMENT EXAMPLE | | |
|---|---|---|---|---|---|
| No. | NAME | DESCRIPTION | 2a | 2b | 2c |
| No. 1 | Uneven pattern (first) | Allocate maximum efficiency value of output current to one or more module devices, and allocate the remaining output current to one module device | 2A | 2A | 1A |
| No. 2 | Uneven pattern (second) | Allocate maximum efficiency value of output current to one or more module devices and additionally allocate the remaining output current to one of those module devices | 3A | 2A | 0A |
| No. 3 | Full balance pattern (uniform type) | Allocate total output current uniformly to all module devices (round off to first decimal point) | 1.7A | 1.7A | 1.6A |
| No. 4 | Full balance pattern (residual type) | Allocate total output current uniformly to all module devices in an integer level and additionally allocate the remaining output current to one of the module devices | 2A | 2A | 1A |
| No. 5 | Semi-balance pattern (uniform type) | Allocate total output current uniformly to some of the module devices (round off to first decimal point) | 2.5A | 2.5A | 0A |
| No. 6 | Semi-balance pattern (residual type) | Allocate total output current uniformly to some of the module devices in an integer level and allocate additionally a remainder current to one of those module devices | 3A | 2A | 0A |

Each of the allocation patterns in Table 2 is described below. The 'allotment example' at the right end column of Table 2 indicates an example of a current value allocated to each of the module devices 2a, 2b, and 2c according to each allocation pattern when the total output current is 5.0 A.

The six types of the allocation patterns No. 1 to No. 6 are chiefly classified an uneven pattern of No. 1 and No. 2, a full balance pattern of No. 3 and No. 4, and a semi-balance pattern of No. 5 and No. 6.

Firstly, in the uneven patterns of Nos. 1 and 2, the output current, i.e., the maximum efficiency value Ip at which conversion efficiency is at a maximum is allocated to at least one of the module devices 2 of the converter group and the remaining output current of the total output current is allocated to one of the module devices 2. As a result, in the uneven pattern, it is concerned that each of the module devices 2a, 2b, and 2c operates at a high conversion efficiency.

In the uneven patterns of Nos. 1 and 2, the remaining output current is differently handled between the first pattern of No. 1 and the second pattern of No. 2. That is, in the first pattern, the remaining output current is allocated to a module device 2 other than module devices 2 to which the output current of the maximum efficiency value Ip has already been allocated.

Accordingly, if the remaining output current is the maximum efficiency value Ip or lower, an output current below the maximum efficiency value Ip is outputted from the module devices 2 to which the remaining output current has been allocated. For example, if the total output current is 5.0 A, 2 A, 2 A, and 1 A as the output current are allocated to the module devices 2a, 2b, and 2c, respectively, in the allocation pattern No. 1.

Further, in the second pattern, the remaining output current is allocated to either one of the module devices 2 to which the output current of the maximum efficiency value has already been allocated. Accordingly, an output current greater than the maximum efficiency value Ip is outputted from the module device 2 to which the remaining output current has been allocated. For example, if the total output current is 5.0 A, 3 A, 2 A and 0 A of the output current are allocated to the module devices 2a, 2b, and 2c, respectively, in the allocation pattern No. 2.

Meanwhile, the full balance pattern Nos. 3 and 4 are patterns for allocating a uniform output current to all the module devices 2a, 2b, and 2c of the converter group so that a difference between output currents of the module devices 2a, 2b, and 2c can be minimized. For example, in the full balance pattern, the amount of the total output current is divided by the number of the module devices 2a, 2b, and 2c included in the converter group, and an output current is allocated to each of the module devices 2a, 2b, and 2c based on the result of the division. In the full balance pattern, it is concerned that the operations of the module devices 2a, 2b, and 2c are balanced, without consideration of the conversion efficiency of each of the module devices 2a, 2b, and 2c.

In the full balance pattern Nos. 3 and 4, it is different whether the output currents uniformly allocated to the module devices 2a, 2b and 2c is to be calculated in a decimal level or an integer level. That is, in the uniform type pattern of No. 3, the total output current is allocated to all the module devices 2a, 2b, and 2c in such a way that the output current allocated to each of the module devices 2a, 2b, and 2c becomes uniform in a decimal level (e.g., rounded off to first decimal point).

In this case, even if a remaining output current of the total output current which is not allocated below the decimal point occurs, the remaining output current is also allocated to all the module devices 2a, 2b, and 2c as equally as possible up to one decimal place. For example, if the total output current is 5.0 A, 1.7 A, 1.7 A, and 1.6 A of the output current are allocated to the respective module devices 2a, 2b, and 2c in the allocation pattern of No. 3.

In the residual type pattern of No. 4, the total output current is allocated to all the module devices 2a, 2b, and 2c so that the output currents of the each module devices 2a, 2b, and 2c becomes uniform in an integer level. Further, if there is a remaining output current, only the integer part of the remaining output current is allocated to all of the module devices 2a, 2b, and 2c as uniform as possible. For example, if the total output current is 5.0 A, the output currents of 2 A, 2 A, and 1 A are allocated to the module devices 2a, 2b, and 2c, respectively, in the residual type pattern of No. 4.

Further, if there is a decimal part of the remaining output current, the remaining output current of the decimal part is allocated to one of the module devices 2. In this case, it is preferred that the remaining output current of the decimal part is allocated to a module device which power conversion efficiency becomes higher when the remaining output current of the decimal part is allocated thereto.

Furthermore, in the semi-balance pattern Nos. 5 and 6, the total output current is allocated to some (e.g., two) of the module devices 2 included in the converter group such that a difference between output currents of the module devices 2 which are allocated is reduced. For example, the amount of a total output current is divided by the number of the module devices 2 to which an output current is allocated, and the resultant value of the division is allocated to each of the module devices 2. For this reason, in the semi-balance pattern, at least one of the module devices 2 stops operating.

The allocation control unit 86 controls the respective module devices 2 not only to output an amount of the allocated output current, but also to stop the operation as described above. Here, a relationship between the uniform type pattern of No. 5 and the residual type pattern of No. 6 is the same as that between the full balance pattern Nos. 3 and 4, and thus a description thereof is omitted.

Accordingly, for example, if the total output current is 5.0 A, 2.5 A, 2.5 A and 0 A of the output current are allocated to the module devices 2a, 2b and 2c, respectively, in the pattern of No. 5, and 3 A, 2 A and 0 A of the output current are allocated to the module devices 2a, 2b and 2c, respectively, in the pattern of No. 6.

In the meantime, the allotment determination unit 85 of the controller 8 calculates the sum (hereinafter, referred to as a 'total input power') of input powers inputted to the module devices 2a, 2b, and 2c of the converter group in the case where the total output current is allocated using one of the six types of allocation patterns stored in the pattern storage unit 84.

Further, the allotment determination unit 85 calculates a power conversion efficiency (hereinafter, referred to as a 'total conversion efficiency') of the converter group as a whole based on a relationship between the total input power and the sum (hereinafter, referred to as a 'total output power') of the output powers of the module devices 2a, 2b, and 2c included in the converter group; and determines an allocation pattern having a maximum total conversion efficiency. The allocation pattern having the maximum total conversion efficiency calculated as described above is used to practically allocate the total output current, and such an allocation pattern used in allocating is also referred to as an "application pattern" hereinafter.

More specifically, the allotment determination unit 85 first receives an instruction including a total output current value from the total output instruction unit 82 and calculates an output current of each of the module devices 2a, 2b, and 2c included in the converter group when the total output current is allocated according to an allocation pattern. Further, the allotment determination unit 85 reads a power conversion efficiency of the respective module devices 2a, 2b, and 2c from the efficiency table stored in the efficiency storage unit 83 based on the calculated output current of the respective module devices 2a, 2b, and 2c.

Accordingly, the output current and the conversion efficiency of each of the module devices 2a, 2b, and 2c are obtained, and input powers of the respective module devices 2a, 2b, and 2c can be calculated using the output current and the conversion efficiency and a known output voltage (voltage supplied to a power line). The sum of the input powers of the module devices 2a, 2b, and 2c that have been calculated as described above becomes the total input power, and the total conversion efficiency can be calculated from the relationship between the total input power and the known total output power. The allotment determination unit 85 stores the calculated total conversion efficiency corresponding to each of the allocation patterns in a temporal memory unit (not shown).

The allocation control unit 86 is informed of an application pattern (one of the allocation patterns) selected by the allotment determination unit 85 as described above. The allocation control unit 86 informed of the application pattern starts to allocate a total output current based on the application pattern by calculating an amount of an output current that needs to be output from each of the module devices 2a, 2b, and 2c. The allocation control unit 86 sends a current instruction indicative of the calculated output current to each of the module devices 2a, 2b, and 2c via the communications unit 81.

In each of the module devices 2a, 2b, and 2c which have received the current instruction via the communications unit 21 from the controller 8 (the allocation control unit 86), the output control unit 23 controls the current control circuit 24 based on the current instruction. Accordingly, the output current designated by the current instruction is outputted from each of the module devices 2a, 2b, and 2c.

The controller 8 selects an application pattern whenever the amount of the total output current exceeds a specific tolerance limit, and reallocates a total output current to the module devices 2a, 2b, and 2c. However, the present invention is not limited thereto, and the selection of an application pattern and the reallocation of a total output current may be regularly performed.

With the above configuration, an output current equivalent to an amount allocated each of the module devices 2a, 2b, and 2c based on an application pattern is outputted from each of the module devices 2a, 2b, and 2c included in the converter group. Here, the application pattern is an allocation pattern selected from among plural types of allocation patterns so that the total conversion efficiency is at the maximum. Accordingly, when the application pattern is applied, the power conversion efficiency of the module devices 2a, 2b, and 2c included in the converter group as a whole is improved. Consequently, it is possible to reduce a loss occurring during power conversion of the converter group, thereby improving the power conversion efficiency in the entire power supply apparatus.

With the embodiment 4, since the module devices 2a, 2b, and 2c included in the converter group all have a common conversion efficiency-output current characteristic, the total conversion efficiency of the converter group is constant even though an output current determined by an application pattern is allocated to any of the module devices 2a, 2b, and 2c. That is, as long as a combination of output currents to be allocated complies with that in the applied allocation pattern, the total conversion efficiency does not change regardless whether each allocated output current is allocated to either module device among the module device 2a, 2b, and 2c. For example, in the allocation pattern of No. 1 in which 2 A, 2 A, and 1 A of output currents are allocated when a total output current is 5 A, the total conversion efficiency is the same even when the output current of 1 A is allocated to either one of the module devices 2a, 2b, and 2c.

As an modified example of the present embodiment 4, the allotment determination unit 85 may includes a combination determination unit (not shown) for determining a combination of output currents that have to be allocated to and a unique allocation unit (not shown) for determining the module devices 2a, 2b, and 2c to which the respective output currents are allocated. With this configuration, the combination determination unit first determines a combination of output currents at which the total conversion efficiency is a maximum based on an allocation pattern, and the unique allocation unit determines an allocation pattern including a module device to which an output current will be allocated as an application pattern.

In this case, the unique allocation unit may randomly determine a module device to which an output current is allocated. It is however preferred that priority be given to the module devices 2a, 2b, and 2c and that the output current be assigned in order of higher priorities first. Here, the priority is not fixedly determined, but may be flexibly determined not to overburden some of the module devices 2a, 2b, and 2c.

For example, the controller 8 may include an accumulation monitoring unit (not shown) for monitoring an accumulated value of the amount of output current in each of the module devices 2a, 2b, and 2c; and a priority determination unit (not shown) for determining a priority based on the monitoring result of the accumulation monitoring unit.

The accumulation monitoring unit monitors the output currents of the respective module devices 2a, 2b, and 2c of the converter group and manages the accumulated value Ah of the output current amounts using a table. The accumulation is executed regularly (e.g., once per second). Further, the accumulation of the output current amounts may be executed by each of the module devices 2a, 2b, and 2c. The priority determination unit determines the priority of each of the module devices 2a, 2b, and 2c such that a priority is higher as an accumulated value is smaller. The priorities may be regularly updated.

With such configuration in which a target to which an output current is allocated is determined based on the priority of each of the module devices 2a, 2b, and 2c, larger output currents are sequentially allocated to the module devices 2a, 2b, and 2c in the order of having smaller accumulated values of the output currents. Accordingly, a difference in the output current amount between the module devices 2a, 2b, and 2c can be reduced. That is, since the multiple module devices 2a, 2b, and 2c can be made uniformly in the operation ratio by equally distributing the operating time thereof, it is possible to prevent overburdening some of the module devices 2a, 2b, and 2c.

Accordingly, a reduction in the lifespan due to the exploitation of some of the module devices 2a, 2b, and 2c can be avoided, and the period over which the power distribution system may continue to be used without replacement of the module devices 2a, 2b, and 2c, becomes longer.

Meanwhile, the conversion efficiency-output current characteristic (the conversion efficiency curve) of each of the module devices 2a, 2b, and 2c may be changed depending on the oscillation control mode of switching in each of the module devices 2a, 2b, and 2c. For example, if the output of each of the module devices 2a, 2b, and 2c is controlled by using a Pulse Width Modulation (PWM), the conversion efficiency-output current characteristic is changed as the switching frequency changes. Further, if a burst control in which an oscillation period for executing the PWM control and an oscillation stop period for stopping the output are alternately repeated is performed, the conversion efficiency-output characteristic varies depending on a change in the timing of the burst control.

For that reason, it is preferred that the controller 8 can previously store the conversion efficiency-output characteristics corresponding to the oscillation control modes with respect to each of the module devices 2a, 2b, and 2c, and, when the oscillation control mode is changed, select a conversion efficiency-output characteristic corresponding to the changed oscillation control mode.

In the embodiment 4, an example in which the conversion efficiency-output characteristics of the module devices 2a, 2b, and 2c are stored in the efficiency storage unit 83 in the form of the efficiency table has been described, but the present invention is not limited thereto. For example, an operation equation indicating a relationship between output current and conversion efficiency may be stored in the efficiency storage unit 83. In this case, the allotment determination unit 83 may calculate the conversion efficiency of each of the module devices 2a, 2b, and 2c using a corresponding operation equation.

Embodiment 5

Next, a power distribution system in accordance with a embodiment 5 of the present invention will be described with reference to FIG. 10. The power distribution system of the embodiment 5 is different from the power distribution system of the embodiment 4 in that a surplus power of a battery 3 can be reversely flowed into the commercial power source AC (the commercial system).

Figure 10:
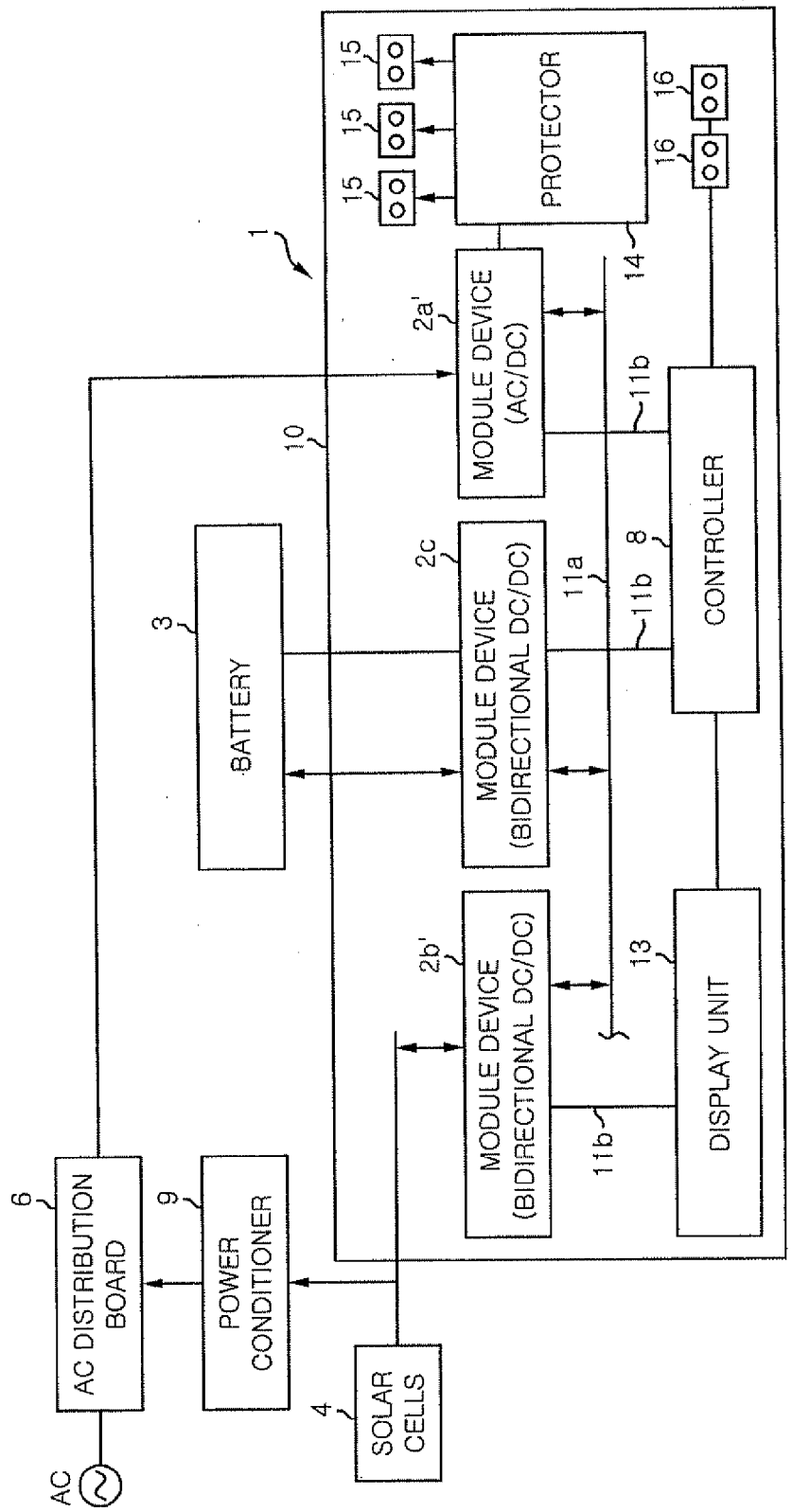
FIG. 10 is a block diagram showing configuration of a power distribution system in accordance with an embodiment 5 of the present invention.

Referring to FIG. 10, solar cells 4 are connected to an AC distribution board 6 via a power conditioner 9 which converts a DC into an AC. Therefore, the surplus power of the solar cells 4 is converted into an AC power through the power conditioner 9 and then reversely flowed (electric power selling) into the commercial system.

In the present embodiment, a power supply apparatus 1 includes a module device 2a' provided between the commercial power source AC and a power line 11a, the module device 2a' serving as an AC/DC converter for converting an AC power into a DC power; a module device 2b' as a bidirectional DC/DC converter provided between the solar cells 4 and the power line 11a; and a module device 2c as a bidirectional DC/DC converter provided between a battery 3 and the power line 11a.

Figure 11:
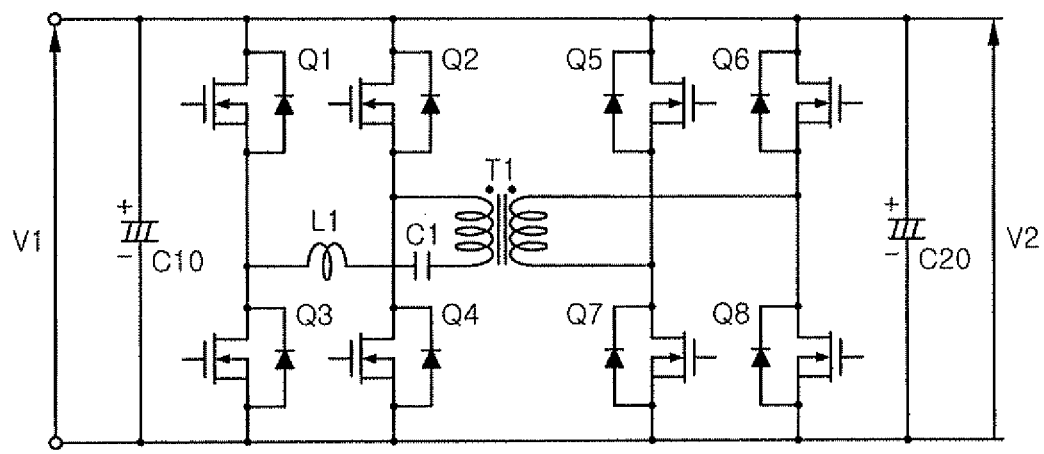
FIG. 11 is a schematic circuit diagram showing configuration of a module device used in the power distribution system shown in FIG. 10.

The module device 2b' provided between the solar cells 4 and the power line 11a includes a first full bridge circuit having first to fourth switching elements Q1 to Q4, and a second full bridge circuit having fifth to eighth switching elements Q5 to Q8. Further, the first and the second full bridge circuit are almost symmetrical to each other and have a transformer T1 interposed therebetween, as shown in FIG. 11, for example. A serial circuit of an inductor L1 and a capacitor C1 is inserted between an output terminal of the first full bridge circuit and the transformer T1.

Thus, when the battery 3 is charged, the first full bridge circuit is operated so that an output V1 (voltage across a smoothing capacitor C10) of the solar cells 4 is transferred to the battery 3 via the transformer T1 and parasitic diodes of the second full bridge circuit. Further, when the battery 3 is discharged, the second full bridge circuit is operated, so that an output V2 (a voltage across the smoothing capacitor C20) of the battery 3 is transferred to the power conditioner 9 via the transformer T1 and parasitic diodes of the first full bridge circuit.

The power supply apparatus 1 further includes a controller 8 including a CPU and the like and a display unit 13 capable of displaying various information, the controller 8 and the display unit 13 being provided in a board unit 10. The controller 8 and the display unit 13 are connected to the module devices 2 via communications line 11b. Connection terminals 15 for power distribution are connected to the power line 11a via a circuit protector 14. Further, connection terminals 16 for communications are connected to the controller 8.

As described above, since the module device 2b' provided between the solar cells 4 and the power line 11a serves as a bidirectional DC/DC converter, the output of the solar cells 4 can be used to charge the battery 3. Further, when there is a surplus power in the output of the solar cells 4, the surplus power is reversely flowed from the battery 3 to the commercial power source AC via the power conditioner 9.

That is, the power conditioner 9 is shared by the solar cells 4 and the battery 3 because powers from the solar cells 4 and the battery 3 are inputted to the power conditioner 9. Accordingly, when a sufficient output is obtained from the solar cells 4, e.g., during the daytime, the battery 3 is charged by the output of the solar cells 4. Further, when the output of the solar cells 4 is reduced, the power can be reverse flowed from the battery 3 to the commercial power source AC.

In the present embodiment 5, an example in which the single module device 2b' serves as the bidirectional DC/DC converter provided between the solar cells 4 and the power line 11a has been described, but the present invention is not limited thereto. For example, the bidirectional power conversion may be realized between the solar cells 4 and the battery 3 using two module devices each serving as a unidirectional DC/DC converter.

The other elements and functions are the same as those of embodiment 4, and description thereof is omitted.

Embodiment 6

Hereinafter, a power distribution system in accordance with an embodiment 6 of the present invention will be described. The power distribution system of the embodiment 6 is different from the power distribution system of embodiment 4 in that at least one of multiple module devices 2a, 2b, and 2c included in a converter group has a different conversion efficiency-output characteristic (conversion efficiency curve).

That is, in the present embodiment 6, a total conversion efficiency is changed not only by a combination of output currents allocated to the respective module devices 2a, 2b, and 2c, but also by a combination of the module devices 2a, 2b, and 2c to which the respective output currents is allocated. For example, in the allocation pattern of No. 1 described in the embodiment 4, if the total output current of 5 A is allocated into 2 A, 2 A, and 1 A, the total conversion efficiency varies depending on whether output current of 1 A will be allocated to which of the module devices 2a, 2b, and 2c.

In the present embodiment 6, patterns (hereinafter referred to as 'low-ranking patterns') into which the six types of allocation patterns of No. 1 to No. 6 (hereinafter, referred to as 'high-ranking patterns') shown in Table 2 as described in the embodiment 4 are further subdivided are used as allocation patterns, the low-ranking patterns being classified based on target module devices to which the output currents are allocated. The allotment determination unit 85 calculates total conversion efficiency for each of the allocation patterns further subdivided as described above and selects an allocation pattern at which the total conversion efficiency is at the maximum as an application pattern.

A detailed example is described below. In this example, it is assumed that the three module devices 2a, 2b, and 2c of the converter group have different conversion efficiency-output characteristics and the power conversion efficiency is at a maximum (maximum efficiency values Ip are 2 A, 3 A, 4 A) when output currents are 2 A, 3 A, and 4 A, respectively.

The allotment determination unit 85 receives an instruction on the total output current and calculates the total conversion efficiency for each of the allocation patterns in which the six types of high-ranking patterns of No. 1 to No. 6 are further subdivided into multiple low-ranking patterns. For example, assuming that the total output current is 7 A, the uneven pattern of No. 1 is subdivided into three types of low-ranking patterns according to whether an output current having a maximum efficiency value Ip is allocated to which of the three module devices 2a, 2b, and 2c.

That is, in a first low-ranking pattern, 2 A, 3 A, and 2 A of output currents are allocated to the module devices 2a, 2b, and 2c, respectively; in a second low-ranking pattern, 0 A, 3

A, and 4 A are allocated to the module devices 2a, 2b, and 2c, respectively; and, in a third low-ranking pattern, 2 A, 1 A, and 4 A are allocated to the module devices 2a, 2b, and 2c, respectively. The allotment determination unit 85 calculates the total conversion efficiency for each of the first to third low-ranking patterns.

With the above-describe present embodiment 6, although a converter group includes the module devices 2a, 2b, and 2c each having different conversion efficiency-output characteristics, the conversion efficiency for the entire converter group can be improved. In addition, since the low-ranking patterns further subdivided by taking into consideration the target to which an output current is allocated can be used, a selectable range is broadened when an allocation pattern having a maximum total conversion efficiency, as compared to the case where only high-ranking patterns are used. Consequently, the total output current can be allocated according to a more suitable application pattern in terms of total conversion efficiency.

The other elements and functions are the same as those of the embodiment 4, and description thereof is omitted.

As the above, although the power converters have been described as module devices 2 in embodiments 4 to 6, devices (e.g., power measurement devices) other than the power converters may be modularized and then installed to power supply apparatus 1 as the module devices 2.

While the invention has been shown and described with respect to the embodiments, the present invention is not limited thereto. It will be understood by those skilled in the art that various changes and modifications may be made without departing from the scope of the invention as defined in following claims.

What is claimed is:

1. A power distribution device, comprising:
a plurality of module devices each serving as a power converter for converting an input power into a desired output power, the module devices being accommodated in a single container, each of the module devices having one of an external dimension having a preset unit size and an external dimension corresponding to a dimension in which two or more module devices each having the preset unit size are arranged side by side; and
a main path electrically connected to the plurality of module devices, the main path including a power line and a communications line,
wherein a power is configured to be supplied from the plurality of module devices to a load via the main path,
wherein each of the plurality of module devices includes a body provided with a connection part and detachably attached to the main path via the connection part, and an internal circuit accommodated in the body and connected to the main path,
wherein the internal circuit has a function of autonomously controlling an output power so that a power needed for the load is supplied to the load and a function of operating in accordance with an external instruction transmitted via the communications line,
wherein at least two module devices of the plurality of module devices constitute a converter group, and a sum of output currents outputted from the at least two module devices of the converter group is supplied to the load as a total output current,
wherein each of the plurality of module devices has an individual power conversion efficiency which varies depending on an amount of a module output current of each of the plurality of module devices, and
wherein the power distribution device further comprises:
an efficiency storage unit which stores a relationship between the module output current and the individual power conversion efficiency;
a pattern storage unit which stores allocation patterns each indicating a rule for allocating the total output current to the at least two module devices of the converter group;
a total output instruction unit for instructing the total output current to be outputted from the converter group;
an allotment determination unit for selecting one of the allocation patterns stored in the pattern storage unit as an application pattern by using the total output current instructed by the total output instruction unit and individual power conversion efficiencies of the at least two module devices of the converter group; and
an allocation control unit for controlling module output currents of the at least two module devices of the converter group so that the total output current is allocated to the at least two module devices of the converter group based on the selected application pattern,
wherein the allotment determination unit calculates a sum of input powers of the at least two module devices of the converter group when the total output current is allocated to the at least two module devices of the converter group, the sum of the input powers being calculated by using the individual power conversion efficiencies of the at least two module devices of the converter group with respect to each of the allocation patterns, and
wherein the allotment determination unit selects an allocation pattern having a minimum sum of the input powers as the application pattern.

2. The power distribution device of claim 1, wherein each of the at least two module devices of the converter group is formed of a switching power supply in which a relationship between a module output current of each of the at least two module devices and an individual power conversion efficiency of each of the at least two module devices varies depending on an oscillation control mode of a corresponding module device, and
wherein the allotment determination unit selects the application pattern using individual power conversion efficiencies corresponding to oscillation control modes of the at least two module devices.

3. The power distribution device of claim 1, wherein the power distribution device is employed in a power distribution system comprising a solar cell, a battery, and a power conditioner having a function of converting a DC power into an AC power,
wherein at least one of the plurality of module devices is provided between the battery and the power conditioner, and
wherein the at least one of the plurality of module devices is connected to the main path, and causes a surplus power provided in at least one of the solar cell and the battery to reversely flow into a commercial power system via the power conditioner.

4. The power distribution device of claim 3, wherein the power conditioner is provided between the solar cell and the commercial power system, and the at least one of the plurality of module devices is provided between the solar cell and the main path, and
wherein the at least one of the plurality of module devices bi-directionally converts a power between the solar cell and the battery, and causes a surplus power of the battery to reversely flow into the commercial power system via the power conditioner.

* * * * *